(12) United States Patent
Pang et al.

(10) Patent No.: US 11,778,951 B2
(45) Date of Patent: Oct. 10, 2023

(54) TRAILED STRAW BIOMASS GRANULATOR

(71) Applicant: Institute of Agricultural Resources and Regional Planning, CAAS, Beijing (CN)

(72) Inventors: Huancheng Pang, Beijing (CN); Xudong Zhang, Shenyang (CN); Tianzhi Ren, Beijing (CN); Ying Nie, Shenyang (CN)

(73) Assignee: Institute of Agricultural Resources and Regional Planning, CAAS, Beijing (CN)

( * ) Notice: Subject to any disclaimer, the term of this patent is extended or adjusted under 35 U.S.C. 154(b) by 132 days.

(21) Appl. No.: 17/457,477

(22) Filed: Dec. 3, 2021

(65) Prior Publication Data

US 2023/0148480 A1   May 18, 2023

(30) Foreign Application Priority Data

Nov. 18, 2021  (CN) .......................... 202111366585.5

(51) Int. Cl.
  *A01F 29/14*   (2006.01)
  *A01F 29/01*   (2006.01)

(52) U.S. Cl.
  CPC .............. *A01F 29/14* (2013.01); *A01F 29/01* (2013.01)

(58) Field of Classification Search
  CPC ......... A01F 29/01; A01F 29/06; A01F 29/10; B01J 2/22; A01D 82/00; A01D 89/00
  See application file for complete search history.

(56) References Cited

FOREIGN PATENT DOCUMENTS

| CN | 208375670 U | * | 1/2019 | ............... B29B 9/06 |
| CN | 109731529 A | * | 5/2019 | ............... B01J 2/22 |

OTHER PUBLICATIONS

Translation of CN-109731529 (Year: 2019).*

* cited by examiner

*Primary Examiner* — Bobby Yeonjin Kim
(74) *Attorney, Agent, or Firm* — Jeenam Park

(57) ABSTRACT

A trailed straw biomass granulator includes a first drive device and a forming device. The forming device includes a driving gear and a forming gear. The driving gear is evenly distributed with involute drive teeth along a circumference. A storage groove is formed between every two adjacent drive teeth. The driving gear includes an output hole in an axial direction, and an auger is arranged inside the output hole. A forming hole is defined between two adjacent drive teeth, and the forming hole penetrates into the output hole and the storage groove. The forming gear includes a base body, multiple involute sliding teeth and multiple reset springs, and the sliding teeth are evenly distributed on the peripheral side of the base body in a circumferential direction. The base body includes multiple sliding grooves in one-to-one correspondence with the sliding teeth, which are integrally formed with a slide block.

7 Claims, 7 Drawing Sheets

TRAILED STRAW BIOMASS GRANULATOR

CROSS-REFERENCE TO RELATED APPLICATIONS

Figure 1:
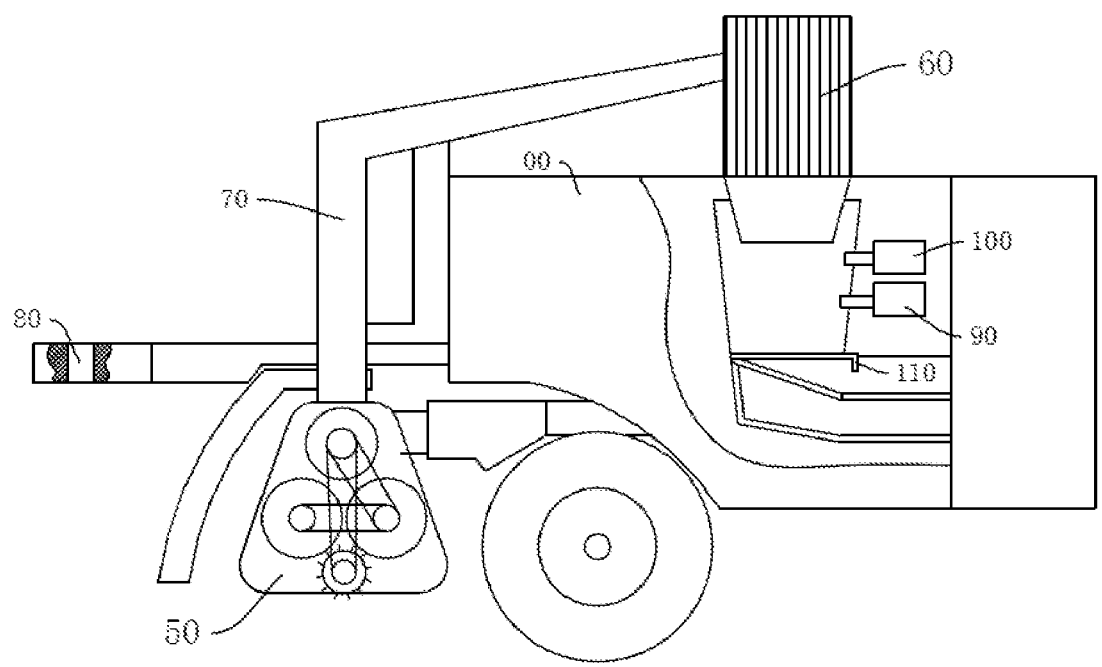

This application claims the benefit and priority of China patent application No. 202111366585.5, filed on Nov. 18, 2021, disclosure of which is hereby incorporated by reference in its entirety.

TECHNICAL FIELD DISCLOSURE

The present disclosure relates to the field of agricultural machinery, in particular to a trailed straw biomass granulator.

BACKGROUND

With the popularization of agricultural production mechanization, most of agricultural planting has realized the mechanized operation. Due to the increase in environmental protection awareness, the incineration of straw after planting of crops has also been banned, and converted into recycling. After crops are harvested, the straw can be used as fuel, fertilizer or animal feed, with high utilization value.

Picking the straw for granulating directly is a high-yield straw processing method in the related art. After the separated straw is broken by a combine harvester or a special-purpose harvesting machinery, the straw can be made into granules by roller-type granulating, which is convenient for the subsequent processing for purpose of fuel, fertilizer and feed. By mixing other additives into the straw, the granulated straw can also be used as highly value-added fertilizer and feed, which greatly improves the utilization rate of the straw.

The utility patent with the patent number ZL.200720093578.1 provides a Tooth-type Granulator, "a tooth-type granulator that produces granules by extruding the material by a pair of meshed gears". This structure and working principles are to "convey liquid by using change in working volume and movement between the pump body and the meshed gears and pressurize it" according to the working principle of the gear pump. There are three key elements in the working principle of the gear pump: (1) change in working volume; (2) "movement" of conveyed object; (3) conveyed object is "liquid". According to involute mesh principle, we know: (1) When a pair of gears are meshed with each other, the force direction of the gear is along the normal direction of the involute; (2) Theoretically, the involute teeth mesh process is a pure rolling process. In the patent of the Tooth-type Granulator, the working principle of the change in volume of the gear pump is used for reference. By using "a tapered die hole inside the groove between the teeth of each gear, connected to the hollow of each gear", it is impossible to make the conveyed "non-liquid" biomass material to "effectively move" towards the forming die hole; especially when it is used for the forming of fibroid biomass material, under the clamping action of the positive pressure on the mesh point (line) of the two tooth profiles, the material cannot move towards the forming hole at the bottom of the teeth, which will further cause increase of the power consumption, severe wear of key parts, and even device failure. The applicant has proved through experiments and practice that, when the biomass forming machine with this structure is working, die and biomass forming material heat up rapidly, and the equipment cannot work normally.

The invention patent with application number 201811328387.8 discloses the ring die structure of an external teeth double-ring-die double-roll granulator, comprising a driving double-roll ring die and a driven double-roll ring die with external teeth of double-roll external teeth ring die system, wherein the external teeth of the two double-roll ring dies mesh with each other; on the "two sides" of the tooth profile, there are forming die holes with a certain angle between the axis and the symmetry plane of the tooth profile; the forming die holes on the two sides of the tooth profile are staggered and arranged in an array in the axis direction of double-roll ring die; the center distance between the driving double-roll ring die and the driven double-roll ring die that are meshed with each other is adjustable. It has the advantages of simple structure, strong adaptability of raw materials, low energy consumption and high production efficiency.

However, because the straw is relatively loose, in the process that the crushed straw is extruded and shaped through the forming hole, if the path distance of the forming hole is too short and the straw is not fully maintained pressure and compressed, then the finished product will be fragile and easy to become loose, which cause inconvenience in transportation and packaging, and it is not easy to be added as a fuel. When the path of the forming hole is long, on the one hand, after the loose straw enters the forming hole, the forming hole needs to be completely filled at the beginning of extrusion, and this process has not yet effectively formed straw granules, which affects the production efficiency; on the other hand, the storage space formed between the two adjacent teeth is used to contain straw scraps, and the amount of granules that can be formed in a single mesh depends on the rotation speed and the capacity in the storage space; when the rotation speed is constant, the storage capacity of the storage space will determine the discharge speed of the granules. Because the crushed material is loose, the material is fed into the storage space in the granulating process when the gear rotates; however, due to extrusion of the gears, the loose material will be extruded and compacted, so that the material fed by the gears is much smaller than the material that can be actually contained in the storage space, which affects the granulating speed. In order to increase the discharge speed, the existing granulator has a larger gear design, so that the single feeding volume of the gear becomes larger. As a result, the overall size of the entire equipment is relatively large, the power of the power system is correspondingly large, and the energy consumption is relatively high, which is not conducive to miniaturization and intensiveness of the equipment.

SUMMARY DISCLOSURE

The present disclosure provides a trailed straw biomass granulator, which can solve the problem that the roller-type granulating is not conducive to miniaturization in the related art.

A trailed straw biomass granulator comprises a rack, a straw picking and processing device, a straw storage room, a straw conveying device, a trailing mechanism, a first drive device and a forming device, wherein the straw picking and processing device, the straw storage room, the straw conveying device, the first drive device and the forming device are all arranged on the rack; the trailing mechanism is used to drive the rack to move, characterized in that, the forming device comprises the driving gear and the forming gear; the first drive device is used to drive the driving gear to rotate;

The driving gear is evenly distributed with the involute drive teeth in the circumferential direction, the storage groove is formed between the two adjacent drive teeth, the driving gear is provided with an output hole in the axial direction, and a auger is arranged inside the output hole; the forming hole is arranged between the two adjacent drive teeth on the driving gear, and the forming hole penetrates into the output hole and the storage groove;

The forming gear comprises a base body, a plurality of involute sliding teeth and a plurality of reset springs, the sliding teeth are evenly distributed on the peripheral side of the base body in the circumferential direction, and the sliding teeth are slidably arranged on the base body; the base body is provided with a plurality of sliding grooves in the one-to-one correspondence with the sliding teeth, the sliding teeth are integrally formed with a slide block, the slide block is slidably arranged inside the sliding grooves, the reset springs are located inside the sliding grooves, one end of the reset spring is fixedly connected inside the sliding grooves, and the other end is fixedly connected to the slide block;

The driving gear meshes with the forming gear, and the sliding teeth have at least a first working state and a second working state:

Under the first working state, one side of the drive teeth contacts against one side of the sliding teeth, the reset springs extend, the sliding teeth deviate from the standard position, and the sliding teeth are used to push the material into the storage groove, wherein the standard position is the position where the sliding teeth are not subjected to external force;

Under the second working state, the two sides of the sliding teeth respectively mesh with the two adjacent drive teeth, and the sliding teeth are used to push the material inside the storage groove into the forming hole.

More preferably, the trailed straw biomass granulator further comprises a preload device and a second drive device, wherein the preload device comprises the base wheel and a plurality of preload rods, the number of the preload rods is greater than that of the drive teeth, the plurality of the preload rods are evenly distributed on the peripheral side of the base wheel in the circumferential direction, and the preload rods are rotatably mounted onto the base wheel through a torsion spring; when the base wheel rotates, the preload rods are driven to push the material into the storage groove; the preload rods cause an impact on the drive teeth upon rotating; the second drive device is used to drive the base wheel to rotate.

More preferably, the rotation speed of the base wheel is greater than that of the driving gear.

More preferably, the trailed straw biomass granulator further comprises a vacuum pump, wherein the base wheel is provided with a dehumidifying hole with an opening at one end, and the vacuum pump penetrates into the dehumidifying hole; the base wheel is provided with suction parts in the one-to-one correspondence with the positions of the preload rods in the radial direction, the preload rod is provided with a water-collecting hole inside, the water-collecting hole penetrates into the suction parts, the side wall of the preload rod is provided with a water-sucking hole, and the water-sucking hole penetrates into the water-collecting hole; when the vacuum pump is working, the water-sucking hole is driven to suck external water vapor.

More preferably, the water-sucking hole is arranged on one side of the preload rod in the rotation direction of the base wheel.

More preferably, the axial lead of the water-sucking hole is arranged obliquely, and the end of the water-sucking hole close to the water-collecting hole is away from the base wheel.

More preferably, the end of the sliding teeth away from the base body has an arc transition.

The present disclosure provides a trailed straw biomass granulator. By setting the sliding teeth to be slidable, when the material is piled up, the sliding teeth will offset under the extrusion of the material, thereby increasing the spacing between the sliding teeth and the drive teeth, so that the sliding teeth enable more material to be fed when the sliding gear rotates. Moreover, the material will be pre-extruded due to the action of the reset springs, during the process that the sliding teeth extrude the material. The present disclosure can increase the actual amount of the material fed in a single time by compacting the fed material once, without increasing the gear, thereby effectively improving the production efficiency, which is beneficial to the miniaturized design of the gear, and can reduce requirements for equipment power.

BRIEF DESCRIPTION OF THE ACCOMPANYING DRAWINGS

Figure 2:
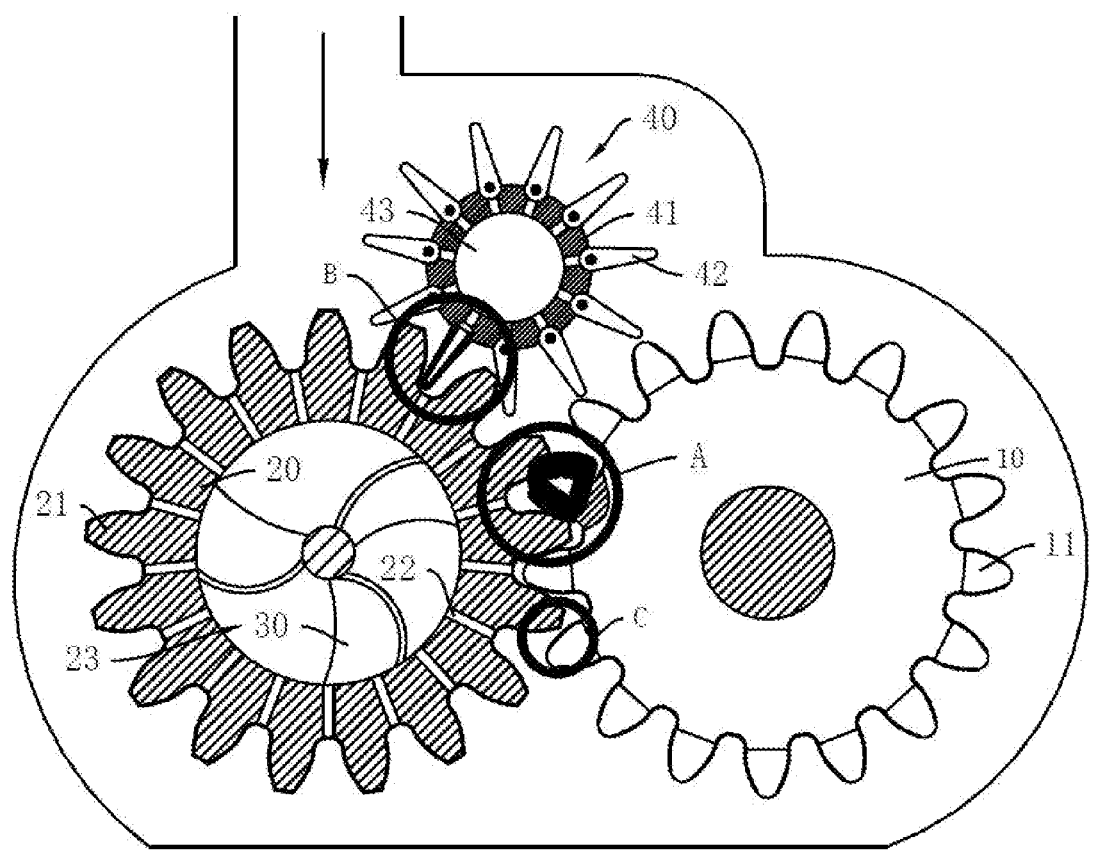
Figure 3:
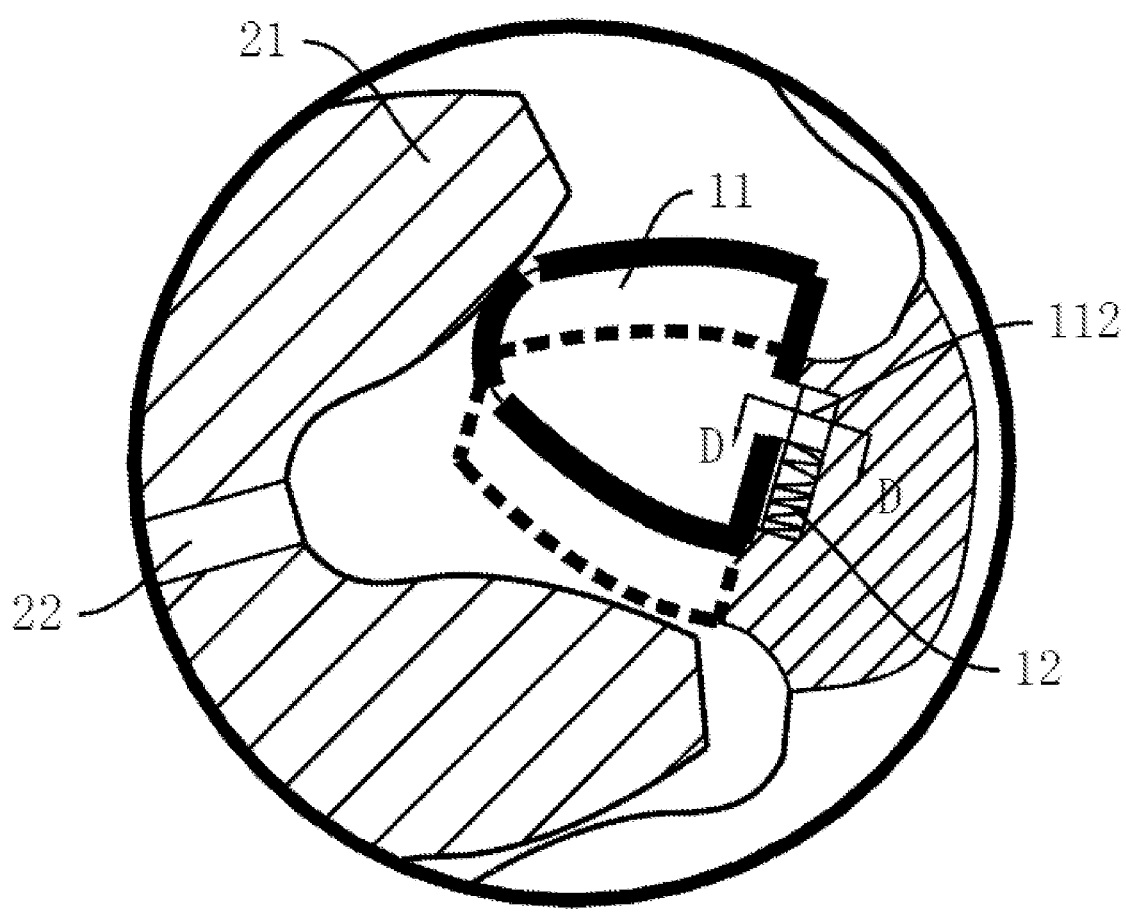
Figure 4:
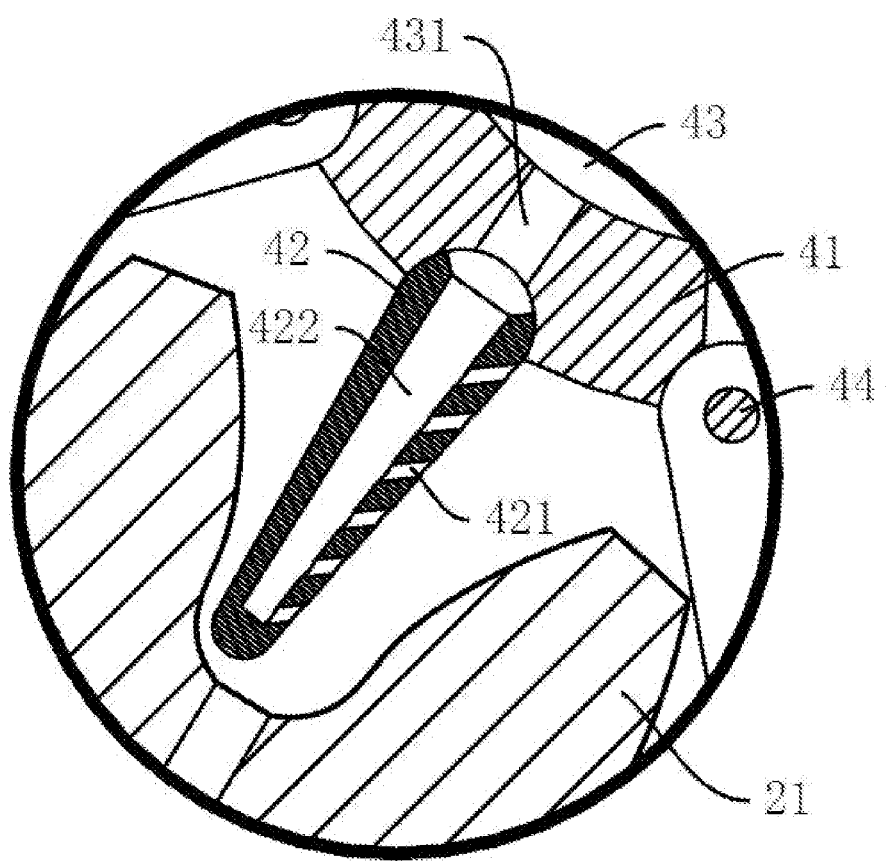
Figure 5:
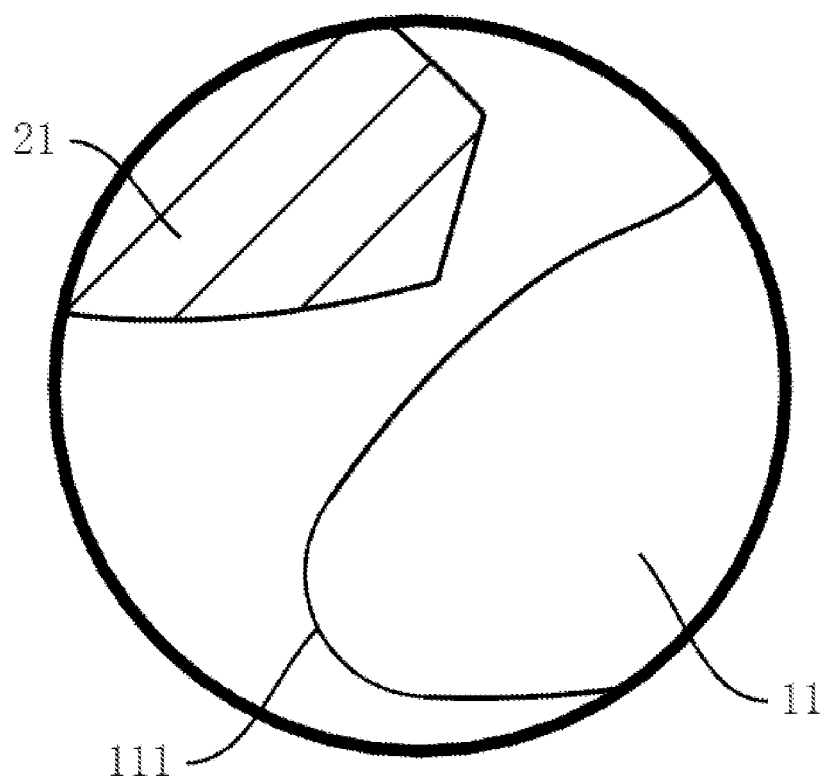
Figure 6:
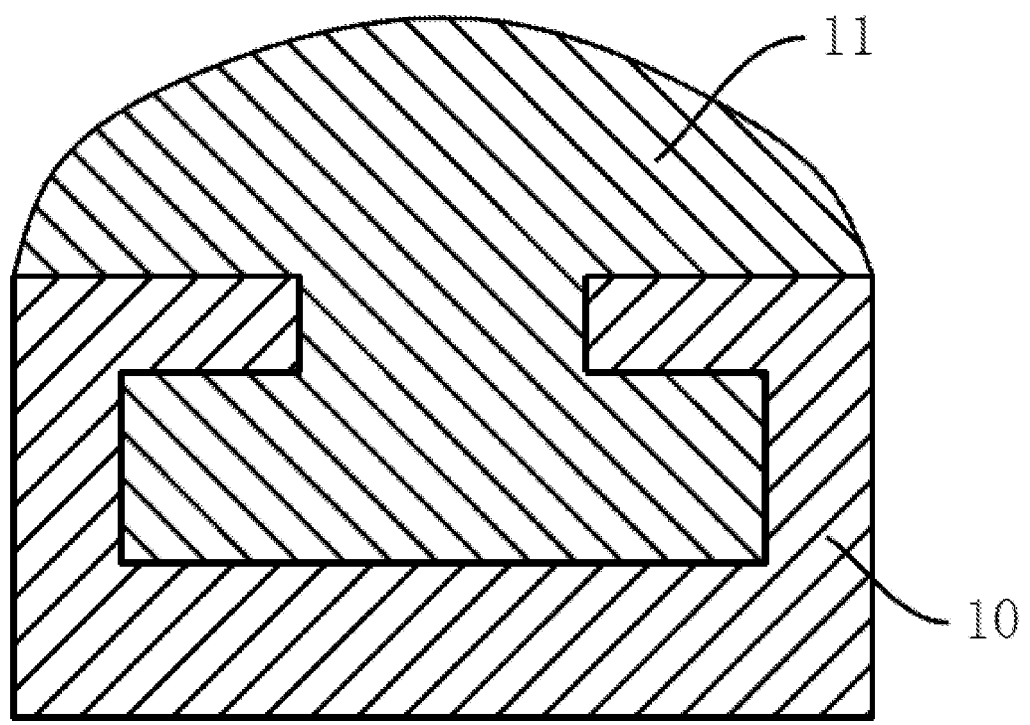
Figure 7:
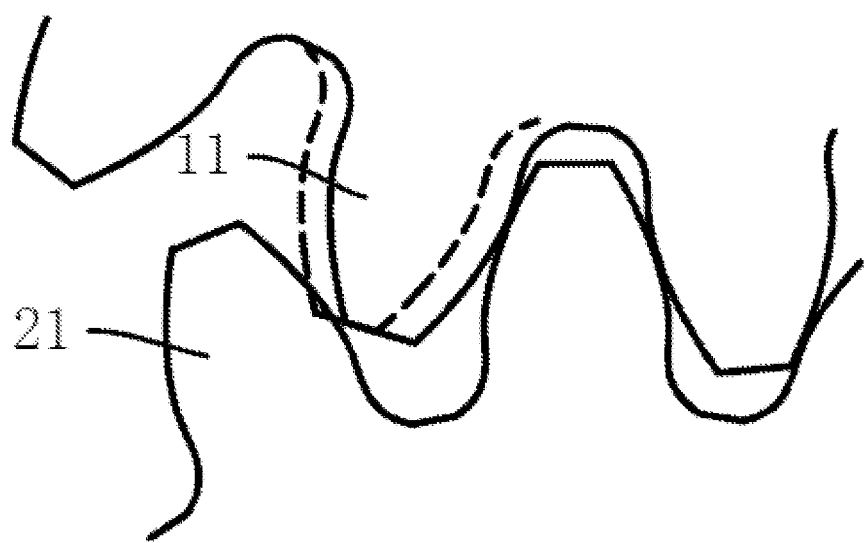

FIG. 1 is a structure diagram of the self-propelled combine harvester;
FIG. 2 is a structure diagram of a trailed straw biomass granulator provided by the present disclosure;
FIG. 3 is a partially enlarged diagram of A in FIG. 2;
FIG. 4 is a partially enlarged diagram of B in FIG. 2;
FIG. 5 is a partially enlarged diagram of C in FIG. 2;
FIG. 6 is a partially enlarged diagram of D-D in FIG. 3;
FIG. 7 is a working diagram of a standard gear mesh state.

DESCRIPTION OF DRAWING SIGNS

10 Forming gear; 101 Sliding groove; 11 Sliding teeth; 111 Arc angle; 112 Slide block; 12 Reset springs; 20 Driving gear; 21 Drive teeth; 22 Forming hole; 30 Auger; 40 Preload device; 41 Base wheel; 42 Preload rod; 421 Water-sucking hole; 422 Water-collecting hole; 43 Dehumidifying hole; 431 Suction parts; 50 Straw picking and processing device; 60 Straw storage room.

DETAILED DESCRIPTION OF ILLUSTRATIVE EMBODIMENTS

A specific embodiment of the present disclosure will be described in detail below with reference to the drawings, but it should be understood that the protection scope of the present disclosure is not limited by the specific embodiments.

Embodiment 1

As shown in FIG. 1, FIG. 1 is an overall structure diagram. It moves by a trailing mechanism. A straw picking and processing device 50 on the front end is used to pick and crush the straw. A straw storage room 60 and a straw conveying device are arranged onto the rack. The crushed straw is conveyed to the straw storage room by the conveying device in the related art. The straw conveying device conveys the straw into the forming device. The straw storage room can be equipped with a dust remover according to actual needs to remove dust. It's worth noting that the content in this part is related art, and its principle is to use the straw picking and crushing machine on the market.

As shown in FIG. 2, an embodiment of the present disclosure provides a trailed straw biomass granulator. The double-roller granulator comprises a casing, wherein the casing has a feed inlet, the feed inlet corresponds to the feed outlet of the above-mentioned crush device; the double-roller granulator comprises a first drive device and a forming device, wherein the first drive device can be an independently-set internal combustion engine or an electric motor, or can be a trailing mechanism which can input power through the transmission mechanism. This part is the related art, which will not be repeated herein. The forming device comprises the driving gear 20 and the forming gear 10. The first drive device is used to drive the driving gear 20 to rotate. The driving gear 20 meshes with the forming gear 10;

The driving gear 20 is evenly distributed with the involute drive teeth 21 in the circumferential direction, the storage groove is formed between the two adjacent drive teeth 21, the driving gear 20 is provided with the output hole in the axial direction, and a auger 30 is arranged inside the output hole, the auger 30 is driven by the power device to rotate; when the material is extruded from the forming, the auger 30 rotates to cut the rod-shaped extrudate into granules and conveys the granules to the outside; as shown in FIG. 2 and FIG. 3, a forming hole 22 is arranged between the two adjacent drive teeth 21 on the driving gear 20, and the forming hole 22 penetrates into the output hole and the storage groove.

The forming gear 10 comprises a base body, a plurality of involute sliding teeth 11 and a plurality of reset springs 12, as shown in FIG. 3, wherein the sliding teeth 11 are evenly distributed on the peripheral side of the base body in the circumferential direction, and the sliding teeth 11 are slidably arranged on the base body; the base body is provided with a plurality of sliding grooves 101 in the one-to-one correspondence with the sliding teeth 11, the sliding teeth 11 are integrally formed with a slide block 112, the slide block 112 is slidably arranged inside the sliding grooves 101, as shown in FIG. 6, wherein the slide block 112 is preferably a T-shaped slide block 112, and the cross section of the sliding groove 101 is also T-shaped; the reset springs 12 are located inside the sliding grooves 101, one end of the reset spring 12 is fixedly connected inside the sliding grooves 101, and the other end is fixedly connected to the slide block 112; when the sliding teeth 11 extrude the straw, it can produce glide; when there is no straw, and the sliding teeth 11 restore to the standard position under the action of the return springs 12.

The driving gear 20 meshes with the forming gear 10, and the sliding teeth 11 have at least a first working state and a second working state:

Under the first working state, as shown in FIG. 3, one side of the drive teeth 21 contacts against one side of the sliding teeth 11, the reset springs 12 extend, the sliding teeth 11 deviate from the standard position, and the sliding teeth 11 are used to push the material into the storage groove, wherein the standard position is the position where the sliding teeth 11 are not subjected to external force, that is, the appearance of standard gear;

Under the second working state, the two sides of the sliding teeth 11 respectively mesh with the two adjacent drive teeth 21, and the sliding teeth 11 are used to push the material inside the storage groove into the forming hole 22.

Upon working, the crushed straw enters from the feed inlet, and is piled between the driving gear 20 and the forming gear 10. When the driving gear 20 rotates, the forming gear 10 is driven to rotate. When the forming gear 10 rotates, the straw is pushed and extruded. The sliding teeth 11 glide due to reaction force of the straw, and deviate from the standard position, which can increase the spacing between the sliding teeth 11 and the drive teeth 21. Moreover, due to the action of the reset springs 12, the sliding teeth 11 will continue to exert pressure on the straw, thereby preloading the straw; as shown in FIG. 3, the dotted line is the state when the gear is in the standard position. It can be seen from the figure that when the straw is present, the spacing between the sliding teeth 11 and the drive teeth 21 on the lower side is greater than that between the sliding teeth 11 at the standard position and the drive teeth 21; when the sliding teeth 11 rotate to the position of the storage groove approximately; the interference occurs between the sliding teeth 11 and the drive teeth 21 on the upper side (At the standard position, no interference occurs; at the standard position, the drive teeth 21 is in the rolling contact with the sliding teeth 11); at this time, the drive teeth 21 will force the sliding teeth 11 to move towards the standard position, thereby further extruding the straw; with the movement of the sliding teeth 11, it gradually moves towards the storage groove, thereby further extruding the straw inside the storage groove, so that the material inside the storage groove is extruded out of the forming hole 22, and cut by the auger 30 into granules.

Embodiment 2

Due to pre-extrusion of the material caused by offset of the sliding teeth 11 and limited conveying capacity of the material, the loose straw is extruded in advance to form a dense structure, which can effectively increase the actual feeding amount per time. Therefore, on the basis of Embodiment 1, the Embodiment 2 further comprises a preload device 40 and a second drive device, as shown in FIG. 2 and FIG. 4. The preload device 40 comprises a base wheel 41 and a plurality of preload rods 42. The number of the preload rods 42 is greater than that of the drive teeth 21. The plurality of preload rods 42 are evenly distributed on the peripheral side of the base wheel 41 in the circumferential direction. The preload rods 42 are rotatably mounted onto the base wheel 41 through the torsion spring. Specifically, the preload rods 42 have a plate-shaped structure, and its two ends are rotatably mounted onto the base wheel 41 through the torsion spring. When the base wheel 41 rotates, the preload rods 42 are driven to push the material towards the storage groove. The rotation of the preload rods 42 can cause an impact on the drive teeth 21, as shown in FIG. 3. When the preload rods 42 rotate, the material is pushed into the storage groove on the driving gear 20, and the excess straw is conveyed into between the driving gear 20 and the forming gear; the second drive device is used to drive the base wheel 41 to rotate. The second drive device can be an independently-set internal combustion engine or an electric motor, or can be an external power equipment which can input power through the transmission mechanism.

Further, the rotation speed of the base wheel 41 is greater than that of the driving gear 20.

Upon working, the second drive device drives the base wheel 41 to rotate, the rotating base wheel 41 drives the preload rods 42 to push the straw into the storage groove from the feed inlet, which can prefill a portion of straw into the storage groove, and push the excess straw into between the driving gear 20 and the forming gear 10 through the preload rods 42; when the preload rods 42 rotate, the speed is faster than that of the driving gear 20, so the preload rods 42 will cause an impact on the drive teeth 21 upon rotating. When there is the straw between the two, the preload rods 42 will cause an impact on the straw, which can make the straw compact and increase the actual feeding amount per time. The rotatable preload rods 42 will offset when being impacted, thereby avoiding interference with the drive teeth 21.

Embodiment 3

When the green straw is recycled, the water content in the straw is relatively high, and the straw will generate a lot of heat due to gear mesh and the rapid impact and friction of the preload rods 42. The heat will evaporate the water, and more water vapor will increase the distance between the molecules, thereby affecting the heat transfer and reducing the bonding force of the straw. Due to limited internal space of the granulator, the water vapor cannot be discharged timely, and the evaporated water vapor forms a high pressure, and thereby lead to the volume expansion, which can increase the occupied space to cause phenomenon of "vapor blockage", even "blasting" in the serious case that the raw material is quickly ejected from the forming hole 22.

Therefore, on the basis of the Embodiment 2, the Embodiment 3 further comprises a vacuum pump, as shown in FIG. 4, wherein the base wheel 41 is provided with a dehumidifying hole 43 with an opening at one end, and the vacuum pump penetrates into the dehumidifying hole 43; the base wheel 41 is provided with suction parts 431 in the one-to-one correspondence with the positions of the preload rods 42 in the radial direction, the preload rod 42 is provided with a water-collecting hole 422 inside, the water-collecting hole 422 penetrates into the suction parts 431, the side wall of the preload rod 42 is provided with a water-sucking hole 421, and the water-sucking hole 421 penetrates into the water-collecting hole 422; when the vacuum pump is working, the water-sucking hole 421 is driven to suck external water vapor.

Further, the water-sucking hole 421 is arranged on one side of the preload rod 42 in the rotation direction of the base wheel 41.

Further, the axial lead of the water-sucking hole 421 is arranged obliquely, and the end of the water-sucking hole 421 close to the water-collecting hole 422 is away from the base wheel 41.

Since the rotating preload rods 42 will cause an impact on the straw, the moisture in the straw will be extruded out under the impact force. When the vacuum pump sucks, this portion of the water vapor is pumped to the outside. In the process of extruding the straw, the water vapor is similarly sucked to the outside through the water-sucking hole 421. As shown in FIG. 4, the aperture can be enlarged at the end of the water-collecting hole 422 close to the base wheel 41, so that the dehumidifying hole 43, the suction parts 431 and the water-collecting hole 422 can be effectively penetrated when the preload rods 42 offset under force. The obliquely-set water-sucking hole 421 is inclined towards the water-collecting hole 422 and away from the dehumidifying hole 43; therefore, the straw is difficult to enter the water-collecting hole 422, and a portion of the remaining straw will be thrown out by the centrifugal force during the rotation of the preload rods 42. In order to further prevent the water-sucking hole 421 from being blocked, a strainer can be set at the position of the water-sucking hole 421.

Embodiment 4

As shown in FIG. 5 and FIG. 7, when the sliding teeth 11 are the standard gear, the sliding will cause interference with the drive teeth 21. Since the standard gear is processed, the chamfers are generally performed. After the sliding teeth 11 move, the contact between the sliding teeth 11 and the drive teeth 21 is converted into the sliding contact from the rolling contact in case of standard mesh. There is a sharp part in the chamfer, which can destroy the tooth surface structure of the drive teeth 21 upon sliding. In case of the standard mesh, the sliding teeth 11 are in the rolling contact with the drive teeth 21. The straw is only extruded without sliding; therefore, more material cannot be effectively pushed into the storage groove. On the basis of the Embodiment 3, in the Embodiment 4, the end of the sliding teeth 11 away from the base body has an arc transition, that is, on the basis of the original standard tooth shape, an arc angle 111 is formed by rounding off the two sides of the tooth shape end. The arc transition ensures that the contact between the sliding teeth 11 and the drive teeth 21 will not destroy the tooth surface structure of the drive teeth 21. Since the sliding teeth 11 form more space for the standard tooth after rounding off, the sliding friction is formed between the sliding teeth 11 and the drive teeth 21, which can effectively drive the straw to form a "flowing" state. Moreover, the straw can be extruded from the forming hole 22 with a smaller driving force, which can reduce the power requirement of the granulator.

It's worth noting that, more preferably, the above-mentioned trailed straw biomass granulator further comprises a water spraying device, which is arranged on the casing for spraying water to the feed inlet, and can adjust the moisture content according to the moisture content of the straw material; a straw storage device, which is arranged on the casing, and can be used to store the crushed straw conveyed by the picking device, and is provided with the dust removal hole below, which is used to remove dust inside the straw; and a straw conveying device, which can convey the straw in the storage device to the forming device.

More preferably, the granulator further comprises a device for spreading fertilizer and other granule materials, which can spread fertilizer and other granule materials into the auger of the straw conveying device;

More preferably, the granulator further comprises a device for spraying bactericide and other liquid materials, which can spray bactericide and other liquid materials into the auger of the straw conveying device.

The above disclosures are only specific embodiments of the present disclosure, but the embodiments of the present disclosure is not limited thereto. Any changes that can be easily imagined by those skilled in the art shall fall within the protection scope of the present disclosure.

What is claimed is:

1. A trailed straw biomass granulator, comprising a rack, a straw picking and processing device, a straw storage room, a straw conveying device, a trailing mechanism, a first drive device, and a forming device, wherein the straw picking and processing device, the straw storage room, the straw conveying device, the first drive device, and the forming device are all arranged on the rack; wherein the trailing mechanism is configured to drive the rack to move, the forming device comprises a driving gear and a forming gear; the first drive device is configured to drive the driving gear to rotate;

wherein the driving gear is evenly distributed with the involute drive teeth in a circumferential direction, the storage groove is defined between two adjacent drive teeth, the driving gear comprises an output hole in an axial direction, and an auger is arranged inside the output hole; the forming hole is arranged between the two adjacent drive teeth on the driving gear, and the forming hole penetrates into the output hole and the storage groove;

wherein the forming gear comprises a base body, a plurality of involute sliding teeth and a plurality of reset springs, the sliding teeth are evenly distributed on a peripheral side of the base body in the circumferential direction, and the sliding teeth are slidably arranged on the base body; the base body comprises a plurality of sliding grooves in one-to-one correspondence with the sliding teeth, the sliding teeth are integrally formed with a slide block, the slide block is slidably arranged inside the sliding grooves, the reset springs are disposed inside the sliding grooves, one end of the reset spring is fixedly connected inside the sliding grooves, and the other end is fixedly connected to the slide block;

wherein the driving gear meshes with the forming gear, and the sliding teeth comprise at least a first working state and a second working state:

wherein under the first working state, one side of the drive teeth contacts against one side of the sliding teeth, the reset springs extend, the sliding teeth deviate from the standard position, and the sliding teeth are configured to push the material into the storage groove, wherein the standard position is the position where the sliding teeth are not subjected to an external force;

wherein under the second working state, the two sides of the sliding teeth respectively mesh with the two adjacent drive teeth, and the sliding teeth are configured to push the material inside the storage groove into the forming hole.

2. The trailed straw biomass granulator according to claim 1, further comprising a preload device and a second drive device, wherein the preload device comprises a base wheel and a plurality of preload rods, the number of the preload rods is greater than that of the drive teeth, the plurality of the preload rods are evenly distributed on the peripheral side of the base wheel in the circumferential direction, and the preload rods are rotatably mounted onto the base wheel through a torsion spring; when the base wheel rotates, the preload rods are driven to push the material into the storage groove; the preload rods are operative to cause an impact on the drive teeth upon rotating; the second drive device is used to drive the base wheel to rotate.

3. The trailed straw biomass granulator according to claim 2, wherein a rotation speed of the base wheel is greater than that of the driving gear.

4. The trailed straw biomass granulator according to claim 1, further comprising a vacuum pump, wherein the base wheel comprises a dehumidifying hole with an opening at one end, and the vacuum pump penetrates into the dehumidifying hole; the base wheel comprises suction parts in one-to-one correspondence with the positions of the preload rods in a radial direction, the preload rod comprises a water-collecting hole inside, the water-collecting hole penetrates into the suction parts, a side wall of the preload rod is provided with a water-sucking hole, and the water-sucking hole penetrates into the water-collecting hole; when the vacuum pump is working, the water-sucking hole is driven to suck external water vapor.

5. The trailed straw biomass granulator according to claim 4, wherein the water-sucking hole is arranged on one side of the preload rod in a rotational direction of the base wheel.

6. The trailed straw biomass granulator according to claim 5, wherein the axial lead of the water-sucking hole is arranged obliquely, and the end of the water-sucking hole adjacent to the water-collecting hole is away from the base wheel.

7. The trailed straw biomass granulator according to claim 1, wherein the end of the sliding teeth away from the base body comprises an arc transition.

* * * * *